United States Patent [19]

Doss

[11] 4,104,350

[45] Aug. 1, 1978

[54] PROCESS FOR ENCAPSULATING OBJECTS AND FOR FORMING FLEXIBLE MOLDS

[75] Inventor: Richard C. Doss, Bartlesville, Okla.

[73] Assignee: Phillips Petroleum Company, Bartlesville, Okla.

[21] Appl. No.: 616,092

[22] Filed: Sep. 23, 1975

[51] Int. Cl.$^2$ ............................ B29C 1/02; B29C 6/02
[52] U.S. Cl. .................................... 264/225; 264/279; 264/337; 427/388 A; 427/435
[58] Field of Search ............... 264/225, 279, 313, 337, 264/338; 260/76; 427/430 R, 385 C, 385 R, 388 A, 435

[56] References Cited

U.S. PATENT DOCUMENTS

| 2,246,332 | 6/1941 | Whiteley, Jr. | 264/313 |
| 2,772,186 | 11/1956 | Mollers et al. | 427/430 R |
| 2,875,182 | 2/1959 | Fettes et al. | 260/79 |
| 3,653,959 | 4/1972 | Kehr et al. | 264/272 |
| 3,817,936 | 6/1974 | Jones et al. | 260/76 |
| 3,856,908 | 12/1974 | Harper | 364/313 |

OTHER PUBLICATIONS

"Flexible Urethane Molds for the Furniture Industry," G. T. Morse, *SPE Journal*, Jun. 1969, vol. 25.

Primary Examiner—James B. Lowe

[57] ABSTRACT

Mercaptoalkanoic acids and thiodialkanoic acids are reacted with a poly(oxyalkylene)-polyol to form poly-(oxyalkylene)-polyester-poly(monosulfide)-polythiols which are useful as encapsulating materials and mold compositions when oxidatively coupled or cured. In one embodiment, a polymeric reaction product, either in the uncured state or partially cured state, is used for the preparation of flexible molds from which regularly or irregularly shaped objects can be made.

7 Claims, No Drawings

PROCESS FOR ENCAPSULATING OBJECTS AND FOR FORMING FLEXIBLE MOLDS

This invention relates to partially cured and cured poly(oxyalkylene)polyester-poly(monosulfide)-polythiol polymers. In accordance with another aspect, this invention relates to mold compositions comprising poly(oxyalkylene)-polyester-poly(monosulfide)-polythiols. In accordance with another aspect, this invention relates to encapsulating materials comprising poly(oxyalkylene)-polyester-poly(monosulfide)-polythiols. In accordance with a further aspect, this invention relates to a process for the encapsulation of regular and irregularly shaped objects and to a process for the formation of flexible molds from which regularly or irregularly shaped objects can be made wherein the encapsulating material and mold composition comprises poly(oxyalkylene)-polyester-poly(monosulfide)-polythiols.

One object of the present invention is to produce encapsulating and molding compositions.

Another objedt of this invention is to provide encapsulating and molding compositions that will cure at ambient condition.

A further object of this invention is to provide encapsulating materials and molding compositions based on poly(oxyalkylene)-polyester-poly(monosulfide)-polythiol polymers.

A further object of this invention is to provide a process for encapsulation of regularly and irregularly shaped objects.

A further object of this invention is to provide a process for the production of flexible molds from which regularly or irregularly shaped objects can be made.

Other aspects, objects, and the several advantages of the invention will be apparent to those skilled in the art from a study of this disclosure and the appended claims.

In accordance with the invention, encapsulating materials and mold compositions are prepared from poly(oxyalkylene)-polyester-poly(monosulfide)-polythiol-based formulations. A wide variety of objects can be cast from a wide variety of molding materials using the compositions of the invention. Formulations useful in preparing the encapsulating materials and molds of this invention contain, in addition to the poly(oxyalkylene)-polyester-poly(monosulfide)-polythiol, other suitable ingredients such as fillers, plasticizers, extenders, stabilizers, curing agents, curing modifiers, pigments, etc.

In accordance with one embodiment of the invention, encapsulating materials or mold compositions are prepared from partially cured or uncured poly(oxyalkylene)-polyester-poly(monosulfide)-polythiols having an average of more than two pendent thiol groups per molecule obtained upon reacting at least one mercaptoalkanoic acid with at least one thiodialkanoic acid and at least one poly(oxyalkylene)-polyol containing an average of more than two hydroxyl groups per molecule.

In accordance with another embodiment of the invention, a process is provided for the formation of flexible molds which comprises encapsulating a desired object with an uncured or partially cured poly(oxyalkylene)-polyester-poly(monosulfide)-polythiol followed by curing thereof and subsequent removal of the desired object from the cured mass, leaving a cavity which then can be filled with a moldable material to form a desired object having regularly or irregularly shaped surfaces.

The polymers useful according to the invention for preparation of the encapsulating materials and mold compositions are poly(oxyalkylene)-polyester-poly(monosulfide)-polythiols having an average of more than two pendent thiol groups per molecule formed by the reaction of at least one mercaptoalkanoic acid and at least one thiodialkanoic acid with a poly(oxyalkylene) polyol having an average of more than two hydroxyl groups per molecule as disclosed in U.S. Pat. No. 3,817,936. U.S. Pat. No. 3,817,936 is hereby incorporated by reference. The various reactants used, conditions of reaction, and ratios of reactants are clearly set forth in said patent.

Fillers useful in the formulation of the invention include many of the well-known fillers from rubber and sealant art including calcium carbonate, titanium dioxide, silica, alumina, zirconia, iron oxide, carbon black, talc, asbestos and the like.

Many of the plasticizers known in the art to be useful in rubber and sealant applications are likewise useful in the preparation of the compositions of the invention. Examples of such plasticizers include dialkyl phthalates, chlorinated hydrocarbons, hydrogenated polyphenyls, low molecular weight polyolefins, such as polyethylene, polypropylene and polybutenes, hydrocarbon oils including the aromatic and naphthenic varieties, and the like.

As desired, stabilizers, antioxidants, antiozonants, etc., can be added to be formulation to protect the finished product. Such additives include butylated hydroxytoluene, 2,2'-methylenebis(4-methyl-6-t-butylphenol), tris(nonylphenyl)phosphite, dibutylzimate, 2-hydroxy-4-n-octoxybenzophenone, and the like.

The poly(oxyalkylene)-polyester-poly(monosulfide)-polythiol-based formulations can be cured with a variety of conventional curing agents including free oxygen-containing gases, such as air; organic peroxides and hydroperoxides, such as di-t-butyl peroxide and cumene hydroperoxide; metal oxides, such as the oxides of lead, zinc, manganese, calcium, barium, copper, mercury, tin and iron; metal carboxylates, such as lead stearate, zinc laurate, zinc acetate; ammonium persulfate; sulfur; metal chromates, and dichromates such as sodium chromate and sodium dichromate; and the like. The organic hydroperoxides are presently preferred curing agents.

Cure accelerators or modifiers are also added to the formulation if desired. Water and tertiary amines, such as 2,4,6-tris(dimethylaminomethyl)-phenol are normally employed. Sulfur and the metal oxides mentioned above, though normally considered curing agents, are also useful in modifying the cure rate when used with other of the above-mentioned curing agents.

The various components of the formulation can be present in any amount which results in encapsulating materials or molds possessing desired properties. Generally the proportions of the various components will fall within the ranges given in the following recipe.

| Component | Parts by Weight |
| --- | --- |
| Poly(oxyalkylene-polyester-poly(monosulfide)-polythiol | 100 |
| Filler | 20–100 |
| Plasticizer | 5–50 |
| Stabilizers | 0.1–5 |
| Curing Agents | 0.5–10 |
| Cure Modifiers | 0.1–3 |
| Other Additives | 0.1–15 |

The components of the formulation can be blended together simultaneously and suitably agitated, e.g., by hand-mixing or machine-blending or the curing agent can be added to the previously blended other components. The particular technique for blending the ingredients will depend in part upon available equipment and the particular ingredients employed.

The curing temperature can vary over a wide range but generally will be within the range of −20° to 100° C and preferably within the range of about 20° to 35° C. The curing time can also vary over a wide range, depending in part on the type curing agent and temperature, but will generally be in the range of about 1 minute to 24 hours and preferably in the range 5 minutes to 5 hours.

The flexible molds of this invention can be made in any suitable fashion which gives a mold which adequately reproduces the shape of the desired object. It is, of course, very convenient to immerse the desired object, or a replica of the desired object, in uncured or partially cured poly(oxyalkylene)-polyester-poly(monosulfide)-polythiol-based formulations and then after curing is complete to remove the desired object from the mass of cured formulation leaving a cavity of desired size, shape, and proportion.

Molds can be fashioned for a wide variety of regularly and irregularly shaped objects. Examples of such objects include gears, gaskets, bearings, threaded parts, seals, bushings, plaques, various art objects, etc.

Many different kinds of molding or moldable materials are available to make copies of objects using the inventive molds. The choice of materials will generally be determined by the desired end use of the molded object. Among the more common such materials are the polyepoxides, polyesters, phenolics, thermosetting resins, plaster of Paris, and concrete which are well known in the art. Molding temperatures of from about 0° C to about 100° C can be employed using the inventive molds with a preferable range being 20° to 50° C. It is also within the scope of the invention to use mold release agents or other known materials to facilitate removal of encapsulated or molded objects.

EXAMPLE

Polyethermercaptopropionate prepared generally as described in U.S. Pat. No. 3,817,936 by reacting a mixture of 3-mercaptopropionic acid and 3,3'-thiodipropionic acid with a poly(oxyalkylene)-polyol derived from 1,2,6-hexanetriol and propylene oxide and possessing 0.83 weight percent thiol group, viscosity at 25° C of 5700 centipoise and an acid number of 0.19 mg KOH per gram of polymer was used to prepare flexible molds according to this invention.

| Formulation - Mold | Parts by Weight |
|---|---|
| Polymer | 100 |
| Calcium carbonate (filler) | 75 |
| Hydrogenated terphenyl (plasticizer) | 25 |
| Cumene hydroperoxide (curing agent) | 6 |
| 2,4,6-tris(dimethylaminomethyl)phenol (curing accelerator) | 0.4 |

The above ingredients were simultaneously blended in a steel container. Two small steel gears (1 inch and 3 inch diameter) were immersed in the mold formulation which gelled in 30–40 minutes at room temperature and fully cured in about 2 hours at room temperature. Removal of the metal gears from the cured formulation left flexible, precise impressions of the gears in the cured mass.

Replicas of the metal gears were cast using the thus-prepared molds and an epoxy-based resin as described in the following recipe.

| FORMULATION-MOLDING MATERIAL | Parts by Weight |
|---|---|
| Epoxy Resin[a] | 38 |
| Pentaerythritol tetra-3-mercaptopropionate | 26 |
| Calcium carbonate | 15 |
| 2,4,6-Tris(dimethylaminomethyl)phenol | 0.2 |
| Carbon black | 0.24 |
| Iron oxide | 1.04 |
| Yellow pigment | 0.3 |

[a]Low molecular weight condensation polymer of epichlorohydrin with Bisphenol A.

The above ingredients were mixed simultaneously and then poured into the above-described molds. After standing overnight (about 16 hours) at room temperature, the cast gears were removed from the molds and were visually observed to be polyepoxide duplicates of the original metal gears.

I claim:

1. A method of encapsulating regular or irregular shaped objects which comprises:
    forming a mixture comprising (1) an uncured or partially cured poly(oxyalkylene)-polyester-poly(monosulfide)-polythiol having an average of more than two pendent thiol groups per molecule formed by reacting (a) at least one mercaptoalkanoic acid, (b) at least one thiodialkanoic acid, and (c) at least one poly(oxyalkylene)-polyol containing an average of more than two pendent hydroxyl groups per molecule and a molecular weight in the range 200–20,000; and (2) a curing agent selected from metallic oxides, organic peroxides, organic hydroperoxides, metallic salts of carboxylic acid, ammonium persulfate, sulfur, metal chromates, and dichromates which is present in an amount sufficient to convert at least about 70 percent of the pendent thiol groups to polysulfide groups;
    immersing the desired object in said uncured or partially cured mixture; and
    allowing said mixture containing said object immersed therein to cure and form a solid mass encapsulating said object.

2. A method according to claim 1 wherein the poly(oxyalkylene)-polyester-poly(monosulfide)-polythiol reaction product is cured at a temperature in the range of about −20° C to about 100° C for a time ranging from about one minute to about 24 hours and further wherein a filler, plasticizer, and a cure accelerator are incorporated into said mixture.

3. A method according to claim 1 wherein (a) is 3-mercaptopropionic acid, (b) is 3,3'-thiodipropionic acid, and (c) is formed by reacting 1,2,6-hexanetriol and propylene oxide.

4. A method of producing molds and molding regular or irregular shaped objects which comprises:
    forming a mixture comprising (1) an uncured or partially cured poly(oxyalkylene)-polyester-poly(monosulfide)-polythiol having an average of more than two pendent thiol groups per molecule formed by reacting (a) at least one mercaptoalkanoic acid, (b) at least one thiodialkanoic acid, and (c) at least on poly(oxyalkylene)-polythiol containing an average of more than two pendent hydroxyl groups per molecule and a molecular weight in the range 200–20,000; and (2) a curing agent selected from metallic oxides, organic peroxides, organic hydroperoxides, metallic salts of carboxylic acid, ammonium persulfate, sulfur, metal chromates, and dichromates which is present in an amount sufficient to convert at least about 70 percent of the pendent thiol groups to polysulfide groups;

immersing a replica of the desired object in said uncured or partially cured mixture;

allowing said mixture containing said object immersed therein to cure by heating at a temperature in the range of about −20° C to about 100° C for a time ranging from about one minute to about 24 hours to form a solid mass encapsulating said object;

removing the object from the solid mass of cured formulation, leaving a mold having a cavity of desired size, shape, and proportion in which a regular or irregular shaped object can be molded;

filling the cavity with a moldable material and allowing same to form the desired object within said cavity conforming to the shape of said cavity; and removing said desired object from said cavity.

5. A method according to claim 4 wherein (a) is 3-mercaptopropionic acid, (b) is 3,3'-thiodipropionic acid, and (c) is formed by reacting 1,2,6-hexanetriol and propylene oxide and the moldable material is an epoxy-based resin and is molded into an object conforming to the shape of said cavity.

6. A method of producing molds and molding regular or irregular shaped objects which comprises:

forming a mixture comprising (1) an uncured or partially cured poly(oxyalkylene)-polyester-poly(-monosulfide)-polythiol having an average of more than two pendent thiol groups per molecule formed by reacting (a) at least one mercaptoalkanoic acid, (b) at least one thiodialkanoic acid, and (c) at least one poly(oxyalkylene)-polyol containing an average of more than two pendent hydroxyl groups per molecule and a molecular weight in the range 200–20,000; and (2) a curing agent selected from metallic oxides, organic peroxides, organic hydroperoxides, metallic salts of carboxylic acid, ammonium persulfate, sulfur, metal chromates, and dichromates which is present in an amount sufficient to convert at least about 70 percent of the pendent thiol groups to polysulfide groups;

immersing a replica of the desired object in said uncured or partially cured mixture;

allowing said mixture containing said object immersed therein to cure and form a solid mass encapsulating said object;

removing the object from the solid mass of cured formulation, leaving a mold having a cavity of desired size, shape, and proportion, in which a regular or irregular shaped object can be molded;

filling the cavity with a moldable material and allowing same to form the desired object within said cavity conforming to the shape of said cavity; and removing said desired object from said cavity.

7. A method according to claim 6 wherein (a) is 3-mercaptopropionic acid, (b) is 3,3'-thiodipropionic acid, and (c) is formed by reacting 1,2,6-hexanetriol and propylene oxide and the moldable material is an epoxy-based resin and is molded into an object conforming to the shape of said cavity.

* * * * *